United States Patent [19]

Kilpatrick et al.

[11] Patent Number: 5,178,555
[45] Date of Patent: Jan. 12, 1993

[54] INSTALLATION OF JUNCTION BOXES ALONG A RACEWAY

[75] Inventors: Jerry B. Kilpatrick, Greensboro; Victor E. Slack, Lewisville, both of N.C.

[73] Assignee: AMP Incorporated, Harrisburg, Pa.

[21] Appl. No.: 771,076

[22] Filed: Oct. 2, 1991

[51] Int. Cl.⁵ .............................................. H01R 4/60
[52] U.S. Cl. .................... 439/215; 439/535; 248/222.4
[58] Field of Search .............. 29/832, 834; 439/535, 439/110, 114–119, 121, 207–213, 215; 248/96, 222.4, 223.1; 220/3.1–3.9

[56] References Cited

U.S. PATENT DOCUMENTS

| | | | |
|---|---|---|---|
| 2,628,050 | 2/1953 | Hardwick | 248/223.1 |
| 2,919,879 | 1/1960 | Hume | 248/906 |
| 3,473,773 | 10/1969 | Meyer | 248/222.4 |
| 4,019,647 | 4/1977 | Arnold | 220/3.3 |
| 4,277,123 | 7/1981 | Haworth et al. | 339/22 R |
| 4,398,647 | 8/1983 | Ackerman | 439/573 |
| 4,527,762 | 7/1985 | Duell | 248/223.1 |
| 4,634,212 | 1/1987 | Boundy et al. | 339/198 R |
| 4,740,167 | 4/1988 | Millhimes et al. | 439/92 |
| 4,874,322 | 10/1989 | Dola et al. | 439/210 |
| 4,964,525 | 10/1990 | Coffey et al. | 248/906 |
| 5,015,203 | 5/1991 | Furrow | 439/535 |

*Primary Examiner*—David L. Pirlot
*Attorney, Agent, or Firm*—David L. Smith; Bruce J. Wolstoncroft

[57] ABSTRACT

A kit (2) adapting a junction box (4) for installation along a raceway comprises, a mounting bracket (10) having a first adjustable mounting mechanism for locating the mounting bracket (10) along the raceway, providing an initial adjustment, and a second adjustable mounting mechanism for securing a junction box (4) to the mounting bracket (10), and for adjustably locating the junction box (4) along the mounting bracket (10), providing a second and final adjustment to accurately locate the junction box (4) between two premeasured lengths of cable (3).

22 Claims, 4 Drawing Sheets

INSTALLATION OF JUNCTION BOXES ALONG A RACEWAY

FIELD OF THE INVENTION

The specification pertains to installation of a junction box for interconnecting lengths of electrical cable and electrical outlets in a moveable, modular wall, and in particular, to installation of such a junction box along a raceway of a moveable, modular wall.

BACKGROUND OF THE INVENTION

A large open space in a building is divided into individual offices by moveable, modular walls that are assembled from multiple wall panels that connect together. The panels provide electrical wiring and electrical outlets for plugging in electrical equipment and electrical appliances. The panels are prewired, in that the electrical wiring and the electrical outlets are installed in the panels at the factory before they are installed in the building. A raceway provides an enclosed tunnel like passage running along the panels to contain the wiring. Containing the wiring in raceway is especially desired to protect the wiring from damage and to prevent electrical shock and electrical fires. The raceway includes a removable cover that extends the entire length of the raceway to uncover the wiring and perform various tasks associated with installation, repair and reconstruction.

During installation of an electrical outlet along the raceway, a skilled worker will need to perform the following tasks; install an outlet box along the raceway, and route the wiring into the outlet box, and connect an electrical outlet to the wiring and install the outlet in the outlet box. Although such installation is time consuming, it can be performed in a factory according to the most efficient means of production. However, once the prewired panels are assembled in a building, installation of additional electrical outlets in the panels is more difficult than factory installation.

In a building, the wiring in a moveable, modular wall may become inadequate and need additional wiring and electrical outlets, for example, when the wiring is overloaded by too many electrical appliances and equipment, or when all the electrical outlets are used up and more are needed, or when sensitive electronic office equipment, such as computers, need their own ground wiring circuit because they may malfunction during the operation of other electrical equipment sharing the same ground wiring circuit. The need to add additional wiring becomes an urgent need, for example, in an instance when computers are moved into the offices, and are plugged into prewired panels, and are unable to work properly because the wiring in the panels is discovered to be inadequate. That leads to a demand to add additional wiring and electrical outlets to the entire building space virtually overnight, so that regular office hours are not interrupted while the inadequate wiring is being fixed. Performing the installation according to traditional techniques using skilled workers, can not be accomplished overnight.

A wiring system described in U.S. Pat. No. 5,015,203, includes electrical wiring in the form of lengths of cable, a junction box, and electrical outlets that are quickly installed because they plug together. Although designed for quick installation, a further need exists to adapt the wiring system for quick, overnight installation in many offices that already have moveable, modular walls. If the installation is time consuming, the installation in the moveable, modular walls can not be accomplished overnight.

SUMMARY OF THE INVENTION

According to the invention, a kit adapts a junction box that interconnects cable and outlets for quick installation in a raceway of a moveable, modular wall. The installation can be performed quickly, in a factory environment or even in a building having multiple offices that need the installation overnight.

A feature of the invention resides in a kit having adjustments to locate junction boxes accurately spaced apart, such that lengths of cable that connect between the junction boxes can be premeasured and built to even lengths, without wasting time to measure distances between the junction boxes and to match different lengths of cable to the measured distances. Although the kit is useful to install electrical junction boxes for interconnecting electrical cable and electrical outlets, it is also useful to install junction boxes for interconnecting fiber optic cable and fiber optic outlets along the cable.

A kit installs each junction box adjustable for location accurately between two premeasured lengths of cable, by including for each junction box; a mounting bracket for the junction box, and with a first adjustable mechanism that initially adjusts the mounting bracket in position along a raceway, providing an initial adjustment, and with a second adjustable mechanism that positions the junction box adjustably along the mounting bracket, providing a second and final adjustment, to locate the junction box accurately between two premeasured lengths of cable.

A kit adapting a junction box for installation along a raceway comprises, a mounting bracket having a first adjustable mounting mechanism for locating the mounting bracket adjustably along the raceway between two premeasured lengths of cable, providing an initial adjustment, and a second adjustable mounting mechanism for securing a junction box to the mounting bracket, and for adjustable locating the junction box along the mounting bracket between two premeasured lengths of cable, providing a second and final adjustment for location between the two premeasured lengths.

DESCRIPTION OF THE DRAWINGS

The invention will now be described by way of example with reference to the accompanying drawings, according to which.

DETAILED DESCRIPTION

Figure 1:
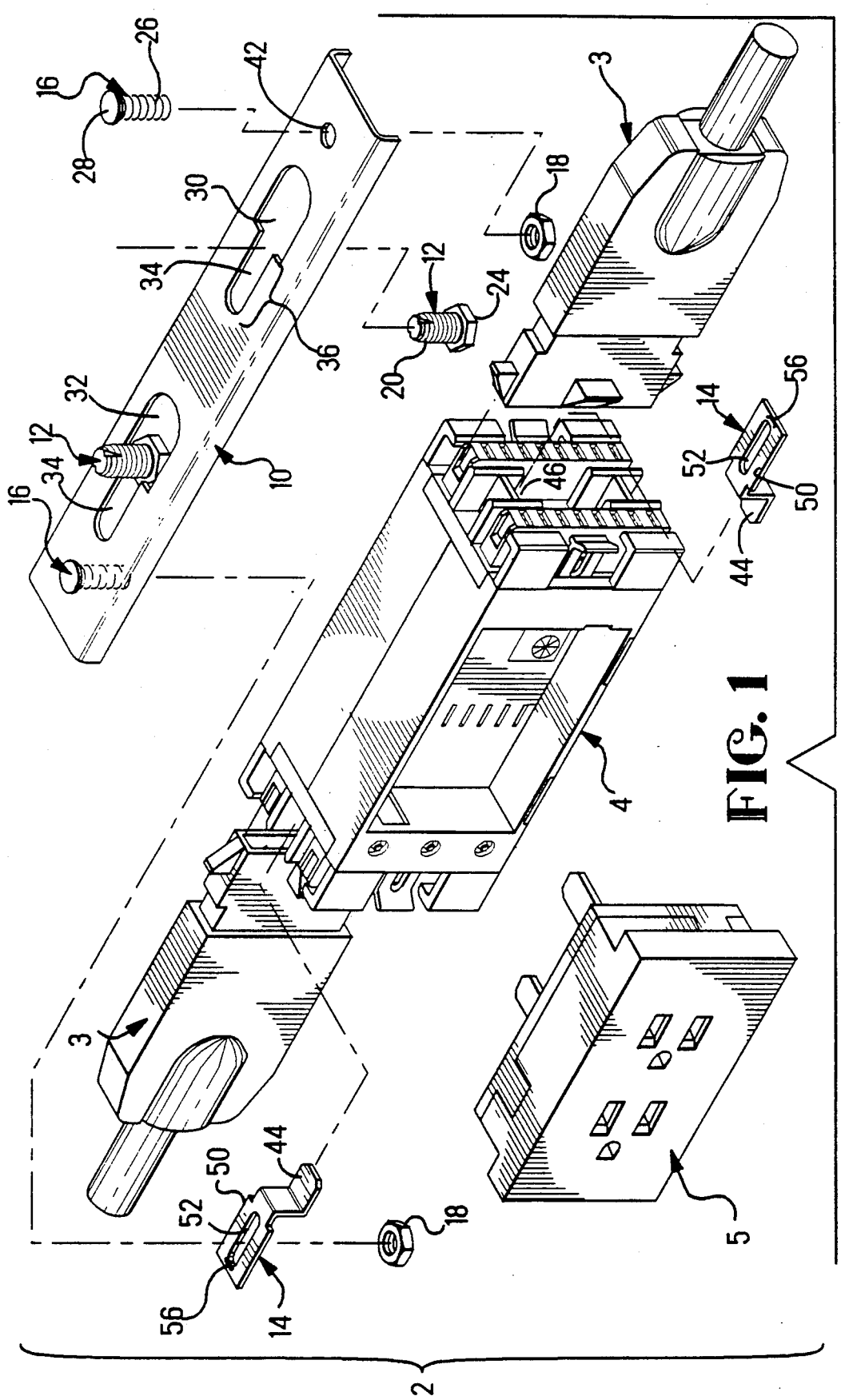
FIG. 1 is a perspective view of an installation kit for a junction box and an outlet.

With reference to FIG. 1, an installation kit 2 includes, a mounting bracket 10, two support brackets 14, two attaching bolts 16 and two threaded nuts 18. The bolts 16 are assembled, spaced apart, to the mounting bracket 10 and project outwardly. The kit 2 adapts a junction box 4 for mounting in a raceway 8, FIGS. 2 and 3, running along a panel 6 of a moveable, modular wall. The junction box 4 interconnects two lengths of cable 3 running along the raceway 8 and at least one outlet 5 along the two lengths of cable 3. For example, the junction box 4 is used for interconnecting electrical cable and at least one electrical outlet along the cable, as described in U.S. Pat. No. 4,277,123. The kit 2 can also adapt for mounting along the raceway 8, a junction box for interconnecting cable other than electrical, such as fiber optic cable, not shown, and for interconnecting a fiber optic outlet, not shown, along the fiber optic cable.

The raceway 8 is found along moveable, modular walls constructed of multiple panels, duplicates of the panel 6. The duplicates of the panel 6 are modular, partly because they are of equal lengths. Once duplicates of the panel 6 have been assembled together to define offices, adding cable 3 and outlets 5 to the panels 6 would be easier if the installation was capable of allowing the cable 3 to comprise equal lengths to extend from panel 6 to panel 6. The lengths of cable 3 would then be fabricated prior to installation in the panels 6, and would be easier to install, as compared with having to measure for each length of cable 3 needed to extend from one panel 6 to another. The kit 2 adapts the junction box 4 for installing cable 3 in the raceway 8, and for installing the junction box 4 and an outlet 5 in between two premeasured and fabricated, equal lengths of cable 3.

Figure 2:
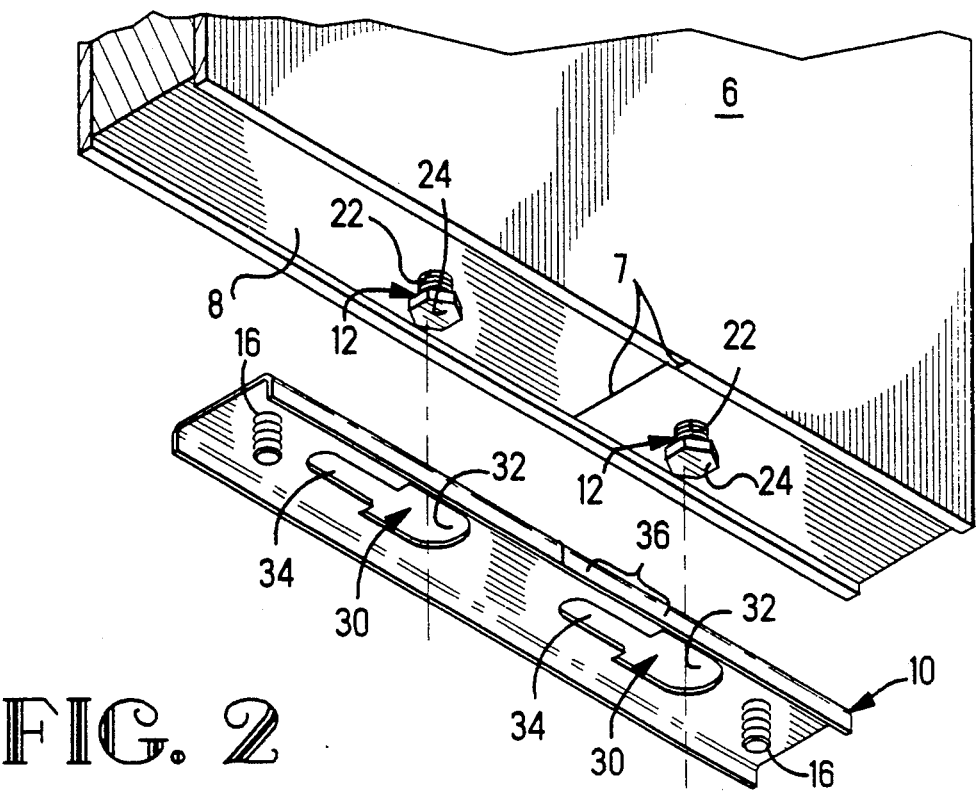
FIG. 2 is a fragmentary perspective view of a mounting bracket of the kit shown in FIG. 1, prior to mounting along a raceway.
Figure 3:
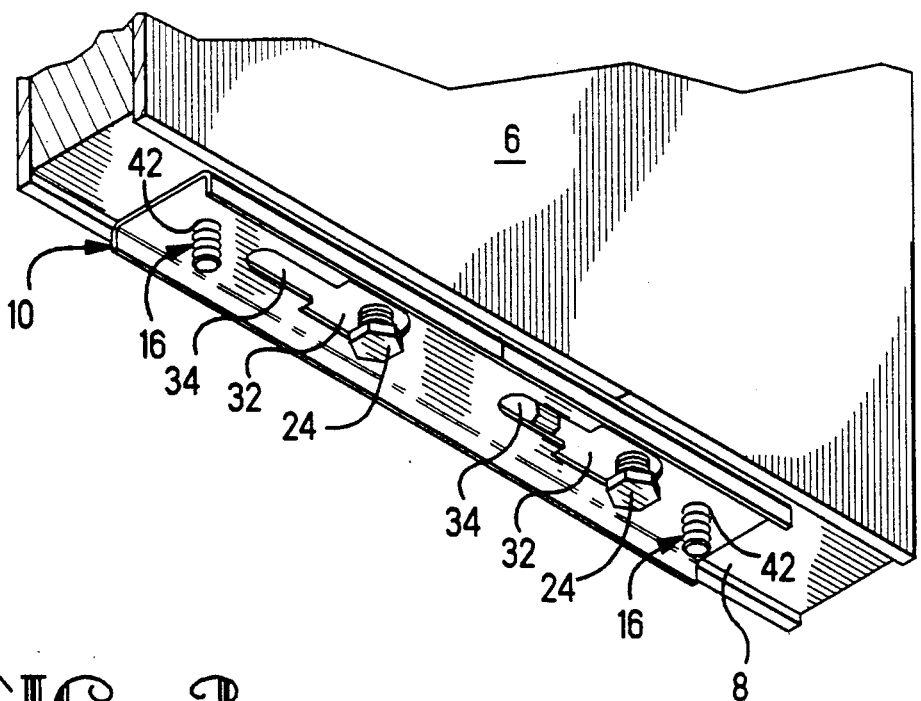
FIG. 3 is a view similar to FIG. 2, illustrating the mounting bracket shown in FIG. 2 mounted in an adjusted position along the raceway.
Figure 4:
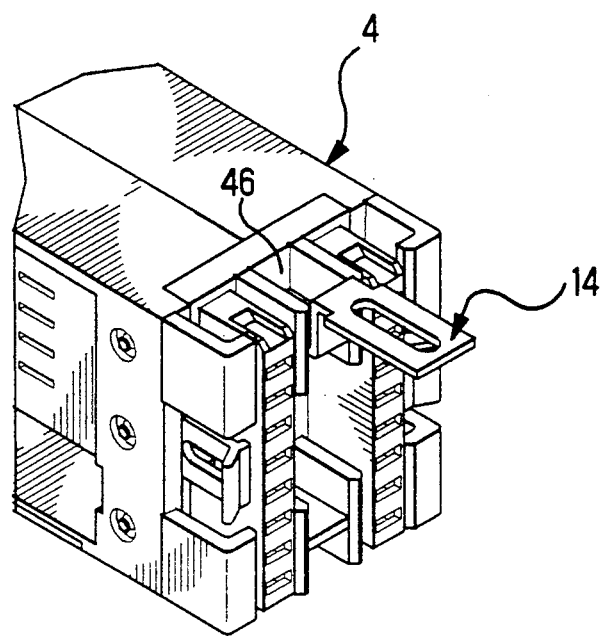
FIG. 4 is a fragmentary perspective view of a junction box and a support bracket of the kit shown in FIG. 1.
Figure 5:
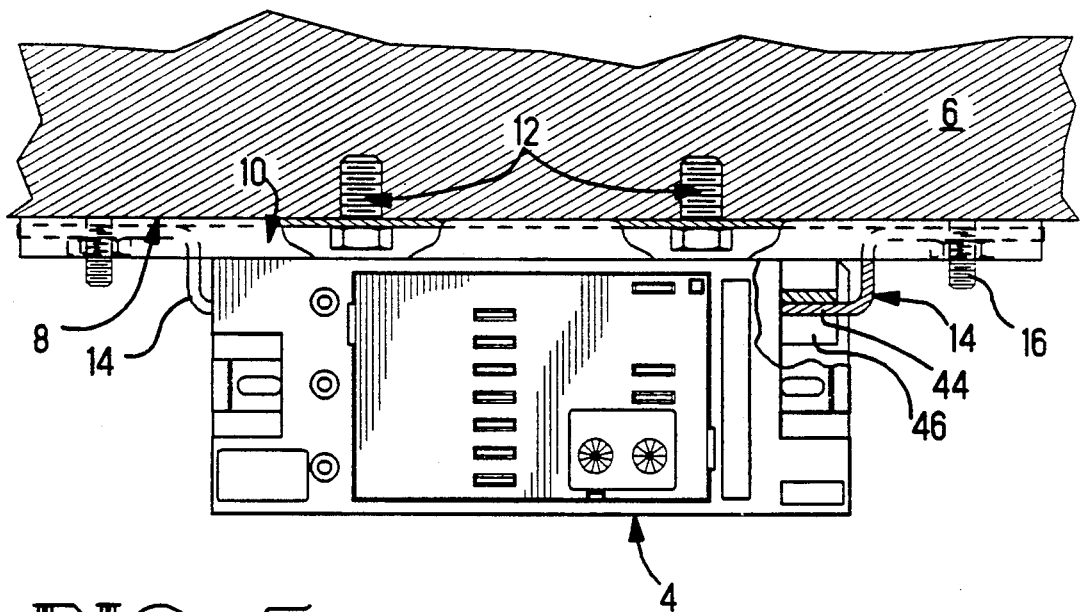
FIG. 5 is a fragmentary elevation view in section of the junction box and support bracket of FIG. 4 mounted in an adjusted position along the raceway.

With reference to FIGS. 2 and 3, the raceway 8 is shown without a cover, not shown, which is removed as a first step to be performed. A top side of the raceway 8 is secured to the panel 6 by a number of fasteners such as threaded screws 12 extending in internally threaded openings 22 of the raceway 8. The length of the panel 6 is measured, and a center mark 7 is placed along the raceway 8 at the midpoint of the measured length. The two screws 12 which are closest to the center mark 7 are partially loosened, so that the screws project out from the top side of the raceway 8.

The mounting bracket 10, FIGS. 2 and 3, is a stamped sheet of metal, formed into a shallow channel with upturned edges, to fit flat against the top side of the raceway 8. Two, spaced apart mounting openings 30 in the mounting bracket 10 receive corresponding screws 12. The openings 30 have enlarged portions 32, larger than enlarged heads 24 of the screws 12, to receive the heads 24 freely therethrough. The openings 30 are elongated along an axis that extends between the screws 12, so that the openings 30 will receive the heads 24 of such screws 12 that can vary in a wide range of distances from the center mark 7.

The openings 30 have narrow portions 34 of widths lesser in dimension than the heads 24 of the mounting screws 12, and slightly larger than threaded shanks of the screws 12. The openings 30 have elongated lengths extending in a direction along the axis that extends between the screws 12. Once the heads 24 of the screws 12 are received in the enlarged portions 32 of the openings 30, the mounting bracket 10 is slid along the raceway 8 to register the center of the mounting bracket 10 approximately with the center mark 7. The narrow portions 34 of the openings 30 will be slid along the raceway 8, receiving threaded shanks 20 of the projecting screws 12. The elongated lengths 36 of the openings 30 permit an extensive movement of the mounting bracket 10 along the raceway 8 to register with the center mark 7 and yet retain the screws 12 in the narrow portions 34 of the openings 30, even though the location of the screws 12 may vary over a wide range of distances from the center mark 7. The screws 12 are then threadably tightened to impinge the heads 24 against the mounting bracket 10 along the narrow portions 34 of the openings 30, to secure the mounting bracket 10 against a top side of the raceway 8.

The procedure described provides a first adjustment to locate the mounting bracket 10 and, consequently, the junction box 4 at the center of the panel 6. A feature of the invention resides in the kit 2 having at least two adjustments to locate a junction box 4 accurately, such that the cables 3 that connect from one junction box 4 in one panel 6, to another junction box 4 in an adjacent panel 6, can be premeasured and built to even lengths, without wasting time to measure distances between the junction boxes 4 and to find or to build different lengths of the cable 6 to the measured distances.

The support brackets 14 is have corresponding projecting tabs 44 installed with a friction fit in corresponding recesses 46 at opposite ends of the junction box 4. Each support bracket 14 has an elongated adjustment flange 50 to project from the junction box 4, and to extend along an axis between the bolts 16. The bolts 16 are mounted in tapped openings 42 of the mounting bracket 10, and are spaced apart a distance greater than the length of the junction box 5. Each adjustment flange 50 is provided with an elongated, narrow opening 52 having a width 56 narrower than the width of a corresponding nut 18 and slightly wider than a threaded shank of a corresponding bolt 16. A length of the opening 52 extends along the axis between the bolts 16. The support brackets 14 are installed on the junction box 4. Then the junction box 4 is swung into position on the mounting bracket 10, with the openings 52 of the support brackets 14 aligned with corresponding bolts 16. The shanks of the bolts are extended through the openings 52. The nuts 18 are partially advanced along the bolts 16, overlapping the flanges 50. The junction box 4 is slid into an adjusted position with a midpoint of the junction box 4 aligned with the center mark 7. The openings 52 of the support brackets 14 will shift while being retained over the bolts 16. The nuts 18 are then tightened against the brackets 14 to secure the junction box in place, tightly against the mounting bracket 10. The procedure described provides a second and final adjustment to locate the junction box 4 at the center of the panel 6. When multiple junction boxes 4 are installed in centers of duplicate panels corresponding to the panel 6, lengths of cable 3, all of which are the same length, can be inserted along the raceway 8 and connected by plugging into the junction boxes 4, without having to measure the distances between the junction boxes 4, and find or build a matching length of cable 3. The outlet 5 is then plugged into the junction box 4. Then, the raceway cover, not shown, can be installed onto the raceway 8. If it is needed to punch an opening, not shown, in the cover to expose the outlet 5, such an opening is provided by using a Greenlee Hydraulic Tool 7904SB, a Greenlee Die Set 50722603, and a Greenlee Punch, one inch size, available from Greenlee Tool Company, a Subsidiary of Textron Inc., 4455 Boeing Drive, Rockford, Ill. 61109.

Figure 6:
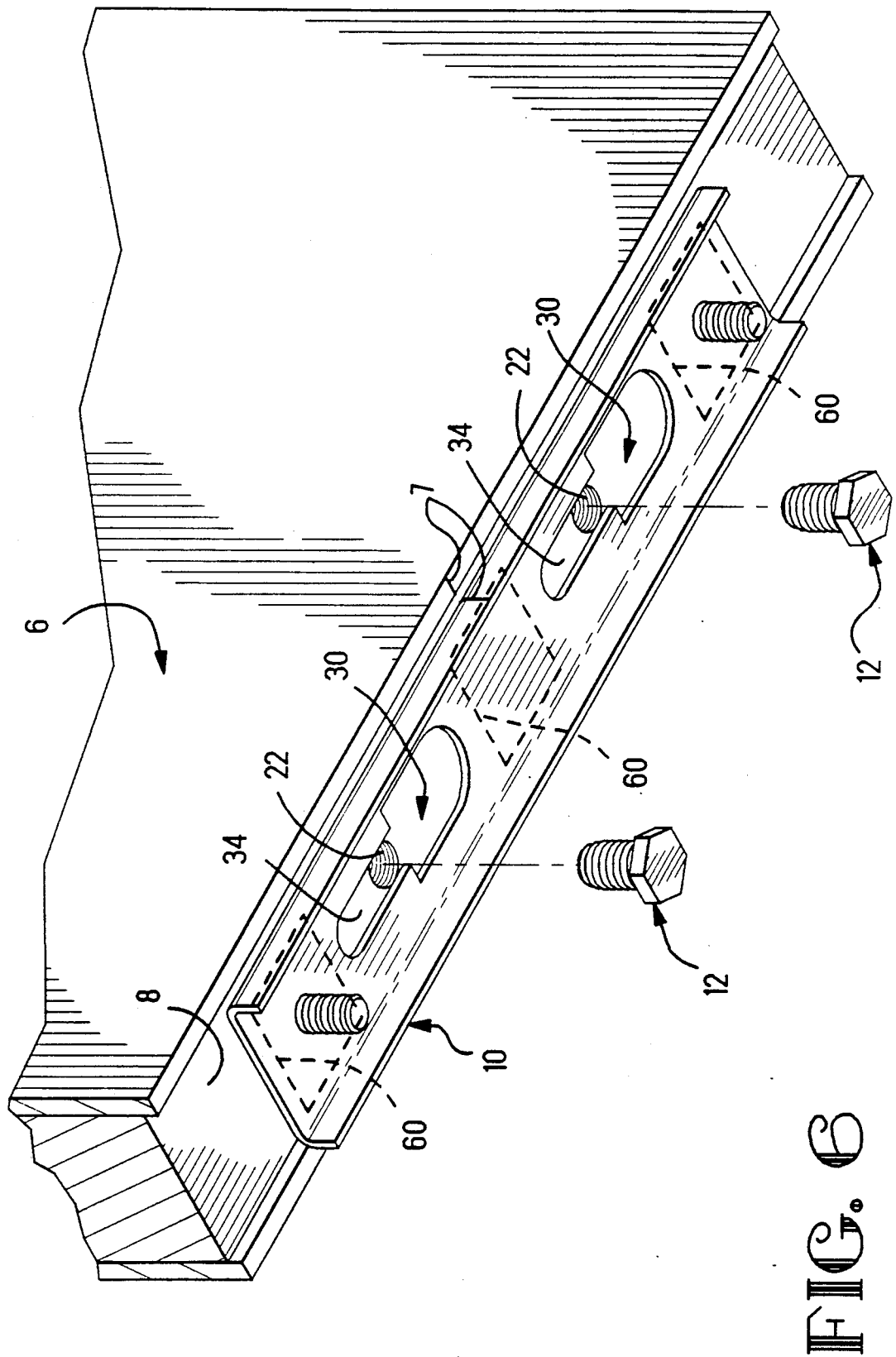
FIG. 6 is a view similar to FIG. 3 illustrating the mounting bracket shown in FIG. 2, held temporarily in place with adhesive tape.

With reference to FIG. 6, a different procedure is used to install the mounting bracket 10 in a raceway 8 that does not have the mounting screws 12. Three sections of adhesive tape 60 are applied to the mounting bracket 10. The adhesive tape 60 has adhesive on both sides. Before attaching the mounting bracket 10 to a top side of the raceway 8, the position of the mounting bracket 10 is adjusted approximately with the center mark 7. Then the mounting bracket 10 is pressed against the raceway 8, causing the adhesive tape 60 to hold the mounting bracket 10 in the adjusted position. Then, holes 22 are drilled into the raceway along the narrow portions 34 of the mounting openings 30. Self tapping mounting screws 12 are driven into the holes 22 to provide the openings 30 with internal threads, and to impinge the mounting bracket 10 and to secure the mounting bracket 10 against the top side of the raceway 8.

I claim:

1. An installation kit for mounting a junction box of an electrical power wiring system to a modular panel, comprising:
   a mounting bracket having an axis, said mounting bracket comprising a mounting opening having a length aligned with the axis and a width less than the length;
   a mounting bolt securable to a raceway of the panel and adapted to be disposed in the mounting opening of said mounting bracket to mount the mounting bracket to the raceway at a pre-selected point;
   a support bracket comprising support means for supporting the junction box;
   attaching means for attaching the support bracket to the mounting bracket;
   the raceway includes an internally threaded bolt receiving opening for receiving the mounting bolt and a second like bolt receiving opening for receiving the second mounting bolt, the mounting openings of the mounting bracket being spaced to correspond to the bolt receiving openings of the raceway.

2. A kit as recited in claim 1, wherein the support means comprises a tab on the support bracket cooperable with a recess on the junction box.

3. A kit as recited in claim 1, wherein the mounting opening comprises a reduced portion and an enlarged portion with a width greater than the width of the reduced portion.

4. A kit as recited in claim 3, wherein the mounting bolt comprises a threaded portion with a diameter less than the width of the reduced portion of the mounting opening and a head with a diameter greater than the width of the reduced portion of the mounting opening to secure the mounting bracket to the raceway and less than the width of the enlarged portion of the mounting opening to pass the mounting bracket over the mounting bolt.

5. A kit as recited in claim 4, further comprising a second like mounting bolt adapted to be disposed in a second like mounting opening of the mounting bracket, said mounting openings being aligned with the axis of the mounting bracket.

6. A kit as recited in claim 4, wherein the length of the reduced portions of the mounting openings is aligned with the axis and is greater than the width, thereby permitting the mounting bracket to be mounted to any of panels having various spacings of bolt receiving openings.

7. A kit as recited in claim 1, wherein the support bracket comprises a tab and a body, said body including an attaching opening having a width perpendicular to an axis through the tab and the body, and wherein the attaching means comprises an attaching bolt and an attaching nut securable thereto, said attaching bolt being adapted to be secured to the mounting bracket and to be inserted through the attaching opening of the support bracket, said attaching bolt comprising a threaded portion with a diameter less than the width of the attaching opening of the support bracket, said attaching nut being securable to the attaching bolt and having a diameter greater than the width of the attaching opening of the support bracket.

8. A kit as recited in claim 7, further comprising a second like support bracket, second support means for supporting the junction box, and second like attaching means for attaching the second support bracket to the mounting bracket;
   wherein the attaching opening of each support bracket has a length perpendicular to the width and greater than the width, and each support bracket is slidable along the length of the attaching opening about the respective bolt, thereby permitting any of various sized of junction boxes to be mounted to the panel.

9. A method of mounting a junction box of an electrical power wiring system in a modular panel, said method comprising the steps of:
   mounting a mounting bracket to a raceway of the panel;
   supporting the junction box by a support bracket;
   attaching the support bracket to the mounting bracket;
   threading a mounting bolt with a threaded portion cooperable with internal threading of a bolt receiving opening in the raceway and having a diameter greater than the width of a reduced portion of a mounting opening of the mounting bracket and less than the width of an enlarged portion of the mounting opening, and a head having a diameter greater than the width of the enlarged portion of the mounting opening, into the bolt receiving opening of the raceway;
   placing the enlarged portion of the mounting opening of the mounting bracket over the head of the mounting bolt and the mounting bracket against the raceway;
   sliding the mounting bracket such that the mounting bolt is within the reduced portion of the mounting opening of the mounting bracket; and
   tightening the mounting bolt to the raceway.

10. A method as recited in claim 9 wherein the step of mounting the mounting bracket to the raceway further comprises the steps of:
   threading a like second mounting bolt into a like second bolt receiving opening of the raceway;
   placing the enlarged portion of a like second mounting opening of the mounting bracket spaced to correspond to the bolt receiving openings over the head of the second bolt;
   sliding the mounting bracket such that the second mounting bolt is within the reduced portion of the second mounting opening of the mounting bracket; and
   tightening the second mounting bolt to the raceway.

11. A method as recited in claim 9 wherein the step of supporting the junction box by the support bracket comprises the step of:

inserting a tab of the support bracket into a slot of the junction box.

12. A method as recited in claim 9 wherein the step of attaching the support bracket to the mounting bracket comprises the steps of:

placing a support opening of the support bracket over an attaching bolt secured in the mounting bracket;

threading an attaching nut cooperable with the attaching bolt and having a diameter greater than the width of the support opening over the attaching bolt; and tightening the attaching nut to the attaching bolt.

13. A method as recited in claim 9 wherein the step of mounting the mounting bracket to the raceway comprises the steps of:

placing the mounting bracket against the raceway with a mounting opening of the mounting bracket aligned with an internally threaded bolt receiving opening of the raceway;

inserting a mounting bolt having a threaded portion cooperable with the bolt receiving opening and with a diameter less than the width of the mounting opening, and a head with a diameter greater than the width of the mounting opening, through the mounting opening;

threading the mounting bolt into the bolt receiving opening; and tightening the mounting bolt to the raceway.

14. A method as recited in claim 9 prior to the step of mounting a mounting bracket to the raceway further comprising the step of:

pre-selecting a point on the panel at which to mount the mounting bracket and the junction box.

15. A method as recited in claim 9 further comprising the steps of:

supporting the junction box by a second support bracket; and attaching the second support bracket to the mounting bracket.

16. A method as recited in claim 15 wherein the step of attaching the second support bracket to the junction box comprises the step of:

inserting a tab of the second support bracket into a slot of the junction box.

17. A method as recited in claim 15 wherein the step of attaching the second support bracket to the mounting bracket further comprises the steps of:

placing a support opening of the second support bracket over a second attaching bolt secured to the mounting bracket;

threading a second attaching nut having a diameter greater than the width of the support opening of the second support bracket over the second attaching bolt; and tightening the second attaching nut to the second attaching bolt.

18. A kit adapting a junction box for installation along a raceway comprises, a mounting bracket having a fist adjustable mounting mechanism for locating the mounting bracket adjustable along the raceway between two premeasured lengths of cable, providing an initial adjustment, and a second adjustable mounting mechanism for securing a junction box to the mounting bracket, and for adjustably locating the junction box along the mounting bracket between two premeasured lengths of cable, providing a second and final adjustment for location between the two premeasured lengths, the second mounting mechanism has threaded bolts extending from the mounting bracket, support brackets on opposite sides of the junction box, narrow openings of the support brackets elongated along an axis extending between the bolts, and the bolts being received in the narrow openings of the support bracket.

19. A kit as recited in claim 18 wherein the first mounting mechanism includes: mounting screws in a side of the raceway, openings of the mounting bracket having enlarged portions for passing over enlarged heads of the mounting screws, the enlarged portions being elongated along an axis extending between the mounting screws, and narrow portions of the openings of the mounting bracket elongated along the axis and receiving shanks of the mounting screws.

20. An installation kit for mounting a junction box of an electrical power wiring system to a modular panel, comprising:

a mounting bracket having an axis, said mounting bracket comprising amounting opening having a length aligned with the axis and a width less than the length;

a mounting bolt securable to a raceway of the panel and adapted to be disposed in the mounting opening of said mounting bracket to mount the mounting bracket to the raceway at a pre-selected point;

a support bracket comprising support means for supporting the junction box;

attaching means for attaching the support bracket to the mounting bracket;

the support bracket has a tab and a body, said body including an attaching opening having a width perpendicular to an axis through the tab and the body, and wherein the attaching means comprises an attaching bolt and an attaching nut securable thereto, said attaching bolt being adapted to be secured to the mounting bracket and to be inserted through the attaching opening of the support bracket, said attaching bolt comprising a threaded portion with a diameter less than the width of the attaching opening of the support bracket, said attaching nut being securable to the attaching bolt and having a diameter greater than the width of the attaching opening of the support bracket.

21. A method of mounting a junction box of an electrical power wiring system in a modular panel, said method comprising the steps of:

mounting a mounting bracket to a raceway of the panel;

supporting the junction box by a support bracket;

attaching the support bracket to the mounting bracket;

placing a support opening of the support bracket over an attaching bolt secured in the mounting bracket;

threading an attaching nut cooperable with the attaching bolt and having a diameter greater than the width of the support opening over the attaching bolt; and tightening the attaching nut to the attaching bolt.

22. A method of mounting a junction box of an electrical power wiring system in a modular panel, said method comprising the steps of:

mounting a mounting bracket to a raceway of the panel;

supporting the junction box by a support bracket;

attaching the support bracket to the mounting bracket;

supporting the junction box by a second support bracket;

attaching the second support bracket to the mounting bracket;

placing a support opening of the second support bracket over a second attaching bolt secured to the mounting bracket;

threading a second attaching nut having a diameter greater than the width of the support opening of the second support bracket over the second attaching bolt; and tightening the second attaching nut to the second attaching bolt.

* * * * *